US011546942B2

(12) United States Patent
Takahashi et al.

(10) Patent No.: US 11,546,942 B2
(45) Date of Patent: Jan. 3, 2023

(54) TERMINAL APPARATUS, BASE STATION APPARATUS, COMMUNICATION METHOD, AND INTEGRATED CIRCUIT

(71) Applicants: SHARP KABUSHIKI KAISHA, Sakai (JP); FG Innovation Company Limited, Tuen Mun (HK)

(72) Inventors: Hiroki Takahashi, Sakai (JP); Shohei Yamada, Sakai (JP); Hidekazu Tsuboi, Sakai (JP); Kazunari Yokomakura, Sakai (JP)

(73) Assignees: SHARP KABUSHIKI KAISHA, Sakai (JP); FG INNOVATION COMPANY LIMITED, Tuen Mun (HK)

( * ) Notice: Subject to any disclaimer, the term of this patent is extended or adjusted under 35 U.S.C. 154(b) by 0 days.

(21) Appl. No.: 16/337,332

(22) PCT Filed: Aug. 15, 2017

(86) PCT No.: PCT/JP2017/029384
§ 371 (c)(1),
(2) Date: Mar. 27, 2019

(87) PCT Pub. No.: WO2018/061501
PCT Pub. Date: Apr. 5, 2018

(65) Prior Publication Data
US 2020/0037365 A1    Jan. 30, 2020

(30) Foreign Application Priority Data

Sep. 29, 2016  (JP) .............................. JP2016-191053

(51) Int. Cl.
*H04W 74/08*  (2009.01)
*H04W 16/28*  (2009.01)
(Continued)

(52) U.S. Cl.
CPC ....... *H04W 74/0833* (2013.01); *H04W 16/28* (2013.01); *H04W 24/08* (2013.01); *H04W 72/046* (2013.01); *H04W 88/023* (2013.01)

(58) Field of Classification Search
CPC . H04W 74/0833; H04W 16/28; H04W 24/08; H04W 72/046; H04W 88/023
(Continued)

(56) References Cited

U.S. PATENT DOCUMENTS 10,548,171 B2 *   1/2020  Lee ................... H04W 74/0858
2010/0260136 A1  10/2010  Fan et al.
(Continued)

FOREIGN PATENT DOCUMENTS

CN     105025519 A     11/2015
JP     2015185914 A    10/2015
(Continued)

OTHER PUBLICATIONS

ZTE, Random access procedure and messages for NB-IoT, R2-160530, 3GPP TSG-RAN WG2 NB-IoT AH Budapest, Hungary, Jan. 19-21, 2016.
(Continued)

*Primary Examiner* — Kwang B Yao
*Assistant Examiner* — Xuan Lu
(74) *Attorney, Agent, or Firm* — Finnegan, Henderson, Farabow, Garrett & Dunner, L.L.P.

(57) ABSTRACT

A terminal apparatus transmits one random access preamble in multiple time sections, and changes a transmit beam to be used to transmit the one random access preamble in one of the multiple time sections or each of the multiple time sections, and monitors a random access response to the one random access preamble. The random access response includes first information for identifying any one of the multiple time sections.

4 Claims, 15 Drawing Sheets

(51) Int. Cl.
  *H04W 24/08* (2009.01)
  *H04W 72/04* (2009.01)
  *H04W 88/02* (2009.01)
  *H04L 5/00* (2006.01)
  *H04B 7/06* (2006.01)
  *H04W 74/00* (2009.01)
  *H04L 27/26* (2006.01)

(58) Field of Classification Search
  USPC .......................................................... 370/329
  See application file for complete search history.

(56) References Cited

U.S. PATENT DOCUMENTS

| | | | |
|---|---|---|---|
| 2010/0261468 A1 | 10/2010 | Chun et al. | |
| 2012/0300752 A1 | 11/2012 | Kwon et al. | |
| 2014/0177607 A1* | 6/2014 | Li | H04B 7/0695 370/336 |
| 2014/0341018 A1 | 11/2014 | Bhushan et al. | |
| 2015/0181624 A1 | 6/2015 | Hwang et al. | |
| 2015/0382205 A1* | 12/2015 | Lee | H04W 52/365 370/329 |
| 2016/0021681 A1 | 1/2016 | Nan et al. | |
| 2017/0325260 A1* | 11/2017 | Guo | H04L 27/265 |
| 2017/0367120 A1* | 12/2017 | Murray | H04B 7/0695 |
| 2018/0092129 A1* | 3/2018 | Guo | H04B 7/0695 |
| 2018/0255586 A1* | 9/2018 | Einhaus | H04L 5/0082 |
| 2018/0375698 A1* | 12/2018 | Zhang | H04W 74/006 |
| 2019/0104549 A1* | 4/2019 | Deng | H04W 24/08 |
| 2019/0104550 A1* | 4/2019 | Yang | H04L 25/0226 |
| 2019/0124649 A1* | 4/2019 | Lunttila | H04L 5/0094 |
| 2019/0182682 A1* | 6/2019 | Kim | H04W 16/28 |
| 2019/0327764 A1* | 10/2019 | Yoo | H04W 72/042 |

FOREIGN PATENT DOCUMENTS

| | | |
|---|---|---|
| JP | 2016506681 A | 3/2016 |
| KR | 10-20140136630 A | 12/2014 |
| RU | 2014142048 A | 5/2016 |
| WO | 2012177060 A2 | 12/2012 |
| WO | WO 2014/086027 A1 | 6/2014 |
| WO | 2015144256 | 10/2015 |
| WO | 2016/086144 A1 | 6/2016 |
| WO | WO 2016/086144 A1 | 6/2016 |

OTHER PUBLICATIONS

U.S. Appl. No. 62/286,983.
CATT, RA-RNTI design, R2-081673 (resubmission of R2-080718), 3GPP TSG RAN WG2 #61bis Shenzhen, China, Mar. 31-Apr. 4, 2008.
NTT Docomo, "Revision of SI: Study on New Radio Access Technology", RP-161214, 3GPP TSG RAN Meeting #72, Busan, Korea, Jun. 13-16, 2016.
Samsung et al., "WF on Supported NR Operations", R1-165559, 3GPP TSG RAN WG1 #85, Nanjing, China, May 23-27, 2016, Agenda item 7.1.6.
Korean Intelletural Property Office, Request for the Submission of an Opinion Notice in relation to Application No. KR 10-2019-7008673, dated Jun. 14, 2021 (5 pages).
Republica De Colombia Superintendencia De Industria Y Comercio, Office Letter No. 12240 in relation to Reference File No. NC 2019/0002747, Aug. 2, 2021 (14 pages).
Instituto Nacional De Propiedad Industrial (INAPI), Resolución de notificación de informe pericial complementario de aceptación Santiago, Apr. 6, 2021, Office Letter in relation to PCT Application No. PCT/2019/000813 (10 pages).
Ericsson, On PRACH Preamble Design, 3GPP TSG-RAN WG1 #86 R1-167058, Gothenburg, Sweden, Aug. 22-26, 2016 (5 pages).
Sharp, Numerology for PRACH Preamble in NR, 3GPP TSG RAN WG1 Meeting #86bis R1-1609876, Lisbon, Portugal, Oct. 10-14, 2016 (3 pages).
CMCC, RACH in Gradual UE-Specific (GUS) Initial Access, 3GPP TSG RAN WG1 Meeting #86bis R1-1609309, Lisbon, Portugal, Oct. 10-14, 2016 (7 pages).
Sharp, Multi-Beam Operation on RACH Procedure in NR, 3GPP TSG RAN WG1 Meeting #87 R1-1612622, Reno, USA, Nov. 14-18, 2016 (4 pages).
Samsung, RACH Preamble Format Considering Beam Correspondence, 3GPP TSG RAN WG1 #87 RI-1612461, Reno, USA, Nov. 14-18, 2016 (4 pages).
República De Colombia Superintendencia De Industria Y Comercio, Office Letter in relation to Expediente No. NC2019/0002747, Nov. 29, 2021 (25 pages).
Korean Intellectual Property Office, Notice of Allowance in relation to Application No. KR 10-2019-7008673, dated Feb. 4, 2022.

* cited by examiner

| BASE STATION TRANSMIT BEAM USED FOR DOWNLINK SIGNAL THROUGH WHICH RANDOM-ACCESS CONFIGURATION INFORMATION IS RECEIVED | AVAILABLE PRACH RESOURCE |
| --- | --- |
| b1 | $R_1$ |
| b2 | $R_2$ |
| b3 | $R_3$ |

FIG. 7

| PRACH CONFIGURATION INDEX | AVAILABLE SUBFRAME NUMBER |
|---|---|
| 0 | $i_1$ |
| 1 | $i_2$ |
| 2 | $i_3$ |
| 3 | $i_4$ |

FIG. 8

| PRACH CONFIGURATION INDEX | TERMINAL TRANSMIT BEAM | AVAILABLE SYMBOL NUMBER |
|---|---|---|
| 0 | FIRST TERMINAL TRANSMIT BEAM | $i_1$ |
|  | SECOND TERMINAL TRANSMIT BEAM | $i_2$ |
| 1 | FIRST TERMINAL TRANSMIT BEAM | $i_3$ |
|  | SECOND TERMINAL TRANSMIT BEAM | $i_4$ |

FIG. 9

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-191053 filed on Sep. 29, 2016, the contents of which are incorporated herein by reference.

BACKGROUND ART

At present, as a radio access system and a radio network technology aimed for the fifth generation cellular system, technical investigation and standard development are being conducted, as extended standards of Long Term Evolution (LTE), on LTE-Advanced Pro (LTE-A Pro) and New Radio technology (NR) in The Third Generation Partnership Project (3GPP) (NPL 1).

In the fifth generation cellular system, three services of enhanced Mobile BroadBand (eMBB) to achieve high-speed and large-volume transmission, Ultra-Reliable and Low Latency Communication (URLLC) to achieve low-latency and high-reliability communication, and massive Machine Type Communication (mMTC) to allow connection of a large number of machine type devices such as Internet of Things (IoT) have been demanded as assumed scenarios.

In order to broaden coverage mainly in a high-frequency cell with high-attenuation, covering the entire cell by configuring multiple areas in a cell by beamforming, and sequentially transmitting signals for respective areas has been discussed in NR (NPL 2).

CITATION LIST

Non Patent Literature

NPL: 1: RP-161214, NTT DOCOMO, "Revision of SI: Study on New Radio Access Technology", June 2016

NPL 2: 3GPP R1-165559 http://www.3gpp.org/ftp/ts-g_ran/WG1_RL1/TSGR1_85/Docs/R1-165559.zip

SUMMARY OF INVENTION

Technical Problem

One aspect of the present invention provides a terminal apparatus capable of efficiently communicating with a base station apparatus, a base station apparatus communicating with the terminal apparatus, a communication method used for the terminal apparatus, a communication method used for the base station apparatus, an integrated circuit used in the terminal apparatus, and an integrated circuit used in the base station apparatus. For example, the communication methods used for the terminal apparatus and the base station apparatus may include an uplink transmission method, a modulation method, and/or a coding method for achieving efficient communication, reducing complexity, and reducing interference between cells and/or between terminal apparatuses.

Solution to Problem (1) Aspects of the present invention are contrived to provide the following means. Specifically, a first aspect of the present invention is a terminal apparatus including: a transmitter configured to transmit one random access preamble in multiple time sections, and change a transmit beam to be used to transmit the one random access preamble in one of the multiple time sections or each of the multiple time sections; and a receiver configured to monitor a random access response to the one random access preamble, wherein the random access response includes first information for identifying any one of the multiple time sections.

(2) A second aspect of the present invention is a base station apparatus including: a receiver configured to receive one random access preamble in multiple time sections from a terminal apparatus; and a transmitter configured to transmit a random access response to the one random access preamble to the terminal apparatus, wherein the random access response includes first information for identifying any one of the multiple time sections.

(3) A third aspect of the present invention is a communication method used in a terminal apparatus, the communication method including: transmitting one random access preamble in multiple time sections; changing a transmit beam to be used to transmit the one random access preamble in one of the multiple time sections or each of the multiple time sections; and monitoring a random access response to the one random access preamble, wherein the random access response includes first information for identifying any one of the multiple time sections.

(4) A fourth aspect of the present invention is a communication method used in a base station apparatus, the communication method including: receiving one random access preamble in multiple time sections from a terminal apparatus; and transmitting a random access response to the one random access preamble to the terminal apparatus, wherein the random access response includes first information for identifying any one of the multiple time sections.

(5) A fifth aspect of the present invention is an integrated circuit mounted on a terminal apparatus, the integrated circuit being configured to cause the terminal apparatus to implement: a function of transmitting one random access preamble in multiple time sections, and changing a transmit beam to be used to transmit the one random access preamble in one of the multiple time sections or each of the multiple time sections; and a function of monitoring a random access response to the one random access preamble, wherein the random access response includes first information for identifying any one of the multiple time sections.

(6) A sixth aspect of the present invention is an integrated circuit mounted on a base station apparatus, the integrated circuit being configured to cause the base station apparatus to implement: a function of receiving one random access preamble in multiple time sections from a terminal apparatus; and a function of transmitting a random access response to the one random access preamble to the terminal apparatus, wherein the random access response includes first information for identifying any one of the multiple time sections.

Advantageous Effects of Invention

According to one aspect of the present invention, a terminal apparatus and a base station apparatus can efficiently communicate and/or can reduce complexity with each other.

BRIEF DESCRIPTION OF DRAWINGS

FIG. 7 is a diagram illustrating an example of a relationship between a base station transmit beam used for a downlink signal through which random access configuration information is received, and an available PRACH resource indicated by the random access configuration information according to the embodiment of the present invention.

FIG. 8 is a diagram illustrating an example of a table of a case that, in the random access configuration information, a transmittable subframe number is indicated as a set of available PRACH resources according to the embodiment of the present invention.

FIG. 9 is a diagram illustrating an example of a relationship between a PRACH configuration index, a terminal transmit beam to be used to transmit a random access preamble, and an index of an available OFDM symbol number according to the embodiment of the present invention.

DESCRIPTION OF EMBODIMENTS

An embodiment of the present invention will be described below.

LTE (and LTE-A Pro) and NR may be defined as different Radio Access Technologies (RATS). NR may be defined as a technology included in LTE. The present embodiment may be applied to NR, LTE, and other RATs. In the following, description is given by using terms related to LTE, but the present embodiment may be applied to other technologies using other terms.

Figure 1:
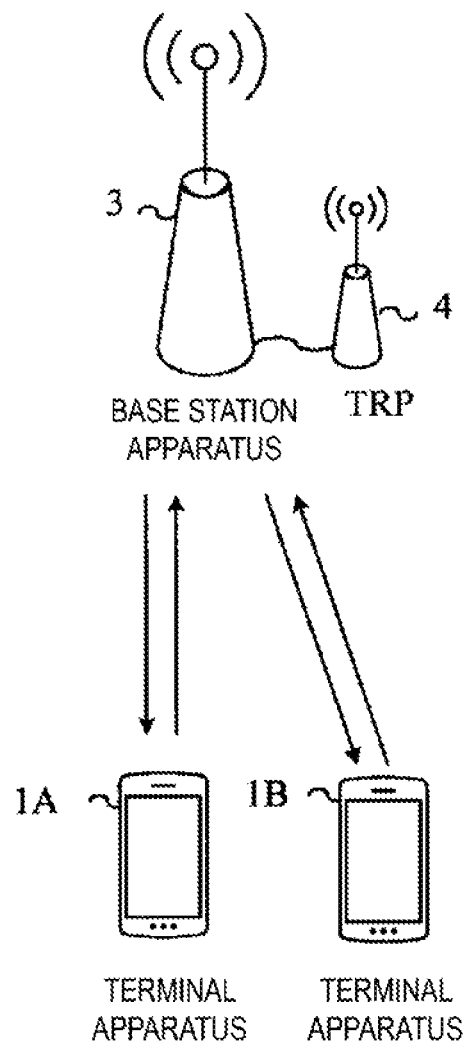
FIG. 1 is a conceptual diagram of a radio communication system according to an embodiment of the present invention.

FIG. 1 is a conceptual diagram of a radio communication system according to the present embodiment. In FIG. 1, the radio communication system includes a terminal apparatus 1A, a terminal apparatus 1B, and a base station apparatus 3. The terminal apparatus 1A and the terminal apparatus 19 are also referred to as a terminal apparatus 1. The terminal apparatus 1 may also be referred to as a mobile station device, a user terminal (User Equipment (UE)), a communication terminal, a mobile device, a terminal, and a Mobile Station (MS), for example. The base station apparatus 3 may also be referred to as a radio base station apparatus, a base station, a radio base station, a fixed station, a Node B (NB), an evolved Node B (eNB), an NR Node B (NR NB), a next generation Node B (gNB), an access point, a Base Transceiver Station (BTS), and a Base Station (BS), for example. The base station apparatus 3 may include a core network apparatus. The base station apparatus 3 may include one or multiple transmission reception points (TRPs) 4. The base station apparatus 3 may serve a communicable range (a communication area) controlled by the base station apparatus 3 as one or multiple cells, to the terminal apparatus 1. The base station apparatus 3 may serve a communicable range (a communication area) controlled by the one or multiple transmission reception points 4 as one or multiple cells, to the terminal apparatus 1. The base station apparatus 3 may divide one cell into multiple partial areas (Beamed areas), and serve the terminal apparatus 1 in each of the partial areas. Here, the partial areas may be identified based on an index of a beam used in beamforming or an index of precoding.

The communication area covered by the base station apparatus 3 may be different in size and shape for each frequency. Moreover, the covered area may be different for each frequency. A radio network, in which cells formed by different types of base station apparatuses 3 and different cell radii coexist in an area on the same frequency or different frequencies to form a single communication system, is referred to as a heterogeneous network.

A radio communication link from the base station apparatus 3 to the terminal apparatus 1 is referred to as a downlink. A radio communication link from the terminal apparatus 1 to the base station apparatus 3 is referred to as an uplink. A radio communication link from the terminal apparatus 1 to another terminal apparatus 1 is referred to as a sidelink.

In FIG. 1, in radio communication between the terminal apparatus 1 and the base station apparatus 3, and/or radio communication between the terminal apparatus 1 and another terminal apparatus 1, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), and Multi-Carrier Code Division Multiplexing (MC-CDM) may be used.

Further, in FIG. 1, in radio communication between the terminal apparatus 1 and the base station apparatus 3, and/or radio communication between the terminal apparatus 1 and another terminal apparatus 1, Universal-Filtered Multi-Carrier (UFMC), Filtered OFDM (F-OFDM), Windowed OFDM, and Filter-Bank Multi-Carrier (FBMC) may be used.

Note that the present embodiment is described by using OFDM symbols with OFDM adopted as a transmission method, but a case of using the above-described other transmission methods is also included in one aspect of the present invention. For example, the OFDM symbol in the present embodiment may be an SC-FDM symbol (which may also be referred to as a Single-Carrier Frequency Division Multiple Access (SC-FDMA) symbol).

Further, in FIG. 1, in radio communication between the terminal apparatus 1 and the base station apparatus 3, and/or radio communication between the terminal apparatus 1 and another terminal apparatus 1, the above-described transmission methods that do not use a CP, or that use zero padding instead of a CP may be used. The CP and the zero padding may be added to both an initial part and an end part.

According to the present embodiment, one or multiple serving cells are configured for the terminal apparatus 1. The configured multiple serving cells include one primary cell and one or multiple secondary cells. The primary cell is a serving cell in which an initial connection establishment procedure has been performed, a serving cell in which a connection re-establishment procedure has been started, or a cell indicated as a primary cell during a handover procedure. The one or multiple secondary cells may be configured at a point of time when or after a Radio Resource Control (RRC) connection is established.

Time Division Duplex (TDD) and/or Frequency Division Duplex (FDD) may be applied to a radio communication system according to the present embodiment. A Time Division Duplex (TDD) scheme or a Frequency Division Duplex (FDD) scheme may be applied to all the multiple cells. Cells to which the TDD scheme is applied and cells to which the FDD scheme is applied may be aggregated.

A carrier corresponding to a serving cell in a downlink is referred to as a downlink component carrier (or a downlink carrier). A carrier corresponding to a serving cell in an uplink is referred to as an uplink component carrier (or an uplink carrier). A carrier corresponding to a serving cell in a sidelink is referred to as a sidelink component carrier (or a sidelink carrier). The downlink component carrier, the uplink component carrier, and/or the sidelink component carrier are collectively referred to as a component carrier (or a carrier).

Beamforming, beam management, and/or beam sweeping according to the embodiment of the present invention will be described.

Beamforming performed on a transmission side is a method of transmitting a signal with high transmit antenna gain in an arbitrary direction by controlling amplitude and phase for each multiple transmit antenna element by means of an analog or digital system. A field pattern of the beamforming is referred to as a transmit beam. A beam on a reception side is a method of receiving a signal with high receive antenna gain in an arbitrary direction by controlling amplitude and phase for each of multiple receive antenna elements by means of an analog or digital system. A field pattern of the beam is referred to as a receive beam.

Beamforming may be referred to as virtualization, precoding, multiplication with weight, or the like. A transmit signal on which beamforming is applied may be simply referred to as a transmit beam.

Note that an antenna port may be allocated to each type of precoding or each transmit beam. For example, a signal transmitted by using different types of precoding, or a signal transmitted by using different transmit beams according to the present embodiment may be defined as a signal transmitted by using one or different multiple antenna ports. Note that the antenna port is defined as an antenna port that a channel on which a certain symbol is transmitted through a certain antenna port can be estimated based on another channel on which another symbol is transmitted through the same antenna port. The same antenna port may refer to an antenna port having the same antenna port number (a number for identifying an antenna port). Multiple antenna ports may constitute an antenna port set. The same antenna port set may refer to an antenna port set having the same antenna port set number (a number for identifying an antenna port set). Transmitting a signal by applying different terminal transmit beams may refer to transmitting a signal by using different antenna ports or different antenna port sets consisting of multiple antenna ports. Each beam index may be an OFDM symbol number, an antenna port number, or an antenna port set number.

In the present embodiment, a transmit beam used by the terminal apparatus 1 in beamforming for uplink transmission is referred to as a terminal transmit beam (UE Tx beam), and a receive beam used by the base station apparatus 3 in beamforming for uplink reception is referred to as a base station receive beam (BS Rx beam). A transmit beam used by the base station apparatus 3 in beam forming for downlink transmission is referred to as a base station transmit beam (BS Tx beam), and a receive beam used by the terminal apparatus 1 in beamforming for downlink reception is referred to as a terminal receive beam (UE Rx beam). Here, the terminal transmit beam and the base station receive beam may be collectively referred to as an uplink beam, and the base station transmit beam and the terminal receive beam may be collectively referred to as a downlink beam. Moreover, processing performed by the terminal apparatus 1 for uplink beamforming may be referred to as terminal transmit beam processing or uplink preceding, and processing performed by the base station apparatus 3 for uplink beamforming may be referred to as base station receive beam processing. Moreover, processing performed by the terminal apparatus 1 for downlink beamforming may be referred to as terminal receive beam processing, and processing performed by the base station apparatus 3 for downlink beamforming may be referred to as base station transmit beam processing or downlink precoding. A complex modulation symbol for one or multiple layers generated in layer mapping is input to transform preceding. The transform preceding may be processing of dividing a block of complex number symbols into sets for respective layers corresponding to one OFDM symbol. In a case that OFDM is used, processing of Discrete Fourier Transform (DFT) in transform preceding may be unnecessary. Preceding may be receiving an input of a block of vectors obtained from a transform precoder, and generating a block of vectors to be mapped to a resource element. In a case of spatial multiplexing, one preceding matrix may be adapted in generation of the block of vectors to be mapped to a resource element. Such processing may be referred to as digital beamforming. Preceding may be defined as including analog beamforming and digital beamforming, or may be defined as digital beamforming. Beamforming may be applied to a signal on which preceding is applied, or preceding may be applied to a signal to which beamforming is applied. Beamforming may include analog beamforming and not include digital beamforming, or may include both digital beamforming and analog beamforming. A signal on which beamforming is applied, a signal on which preceding is applied, or a signal subjected to beamforming and preceding may be referred to as a beam. An index of a beam may be an index of a preceding matrix. The index of a beam and the index of a preceding matrix may be independently defined. A signal may be generated by applying a precoding matrix indicated by the index of a precoding matrix to a beam indicated by the index of the beam. A signal may be generated by applying beamforming indicated by the index of a beam to a signal to which a precoding matrix indicated by the index of a precoding matrix is applied.

Digital beamforming may be adapting different precoding matrices to a resource in a frequency direction (e.g., a set of subcarriers).

Note that multiple base station transmit beams may be transmitted from the base station apparatus 3 in one OFDM symbol. For example, the antenna element of the base station apparatus 3 may be divided into subarrays, and different types of beamforming may be performed with each of the subarrays. Different types of beamforming may be performed with polarized waves by using a polarized antenna. Similarly, multiple terminal transmit beams may be transmitted from the terminal apparatus 1 in one OFDM symbol.

Physical channels and physical signals according to the present embodiment will he described.

In FIG. 1, the following physical channels are used for radio communication between the terminal apparatus 1 and the base station apparatus 3. The physical channels are used to transmit information output from a higher layer.

Physical Broadcast CHannel (PBCH)
Physical Control CHannel (PCCH)
Physical Shared CHannel (PSCH)
Physical Random Access Channel (PRACH)

The PBCH is used in order for the base station apparatus 3 to broadcast essential information block (Master information Block (MIB), Essential Information Block (EIB)) including essential system information (Essential information) that is required by the terminal apparatus 1. Here, one or multiple essential information blocks may be transmitted as an essential information message. For example, the essential information block may include information (e.g., information about a position in a superframe consisting of multiple frames) indicating a part or all of frame numbers (System Frame Numbers (SFNs)). For example, a radio frame (10 ms) consists of 10 subframes, and each of the subframes has 1 ms. The radio frame is identified by the frame number. After reaching 1024, the frame number returns to 0 (Wraps around). In a case that a different essential information block is transmitted for each area of a cell, information (e.g., identifier information of a base station transmit beam that forms an area) with which the area can be identified may be included. Here, the identifier information of the base station transmit beam may be indicated by using an index of the base station transmit beam (preceding). In a case that a different essential information block (essential information message) is transmitted for each area in a cell, information with which a time position in a frame (e.g., a subframe number including the essential information block (essential information message)) can be identified may be included. In other words, information for determining each subframe number, with which an essential information block (essential information message) using an index of a different base station transmit beam is transmitted, may be included. For example, the Essential information may include information necessary for connection to a cell and mobility.

The PCCH is used to transmit Uplink Control Information (UCI) in a case of uplink radio communication (radio communication from the terminal apparatus 1 to the base station apparatus 3). Here, the Uplink Control Information may include Channel State Information (CSI) used to indicate a downlink channel state. The Uplink Control Information may include a Scheduling Request (SR) used to request an UL-SCH resource. The Uplink Control Information may include Hybrid Automatic Repeat request ACKnowledgment (HARQ-ACK). The HARQ-ACK may indicate HARQ-ACK for downlink data (Transport block, Medium AccessControl Protocol Data Unit (MAC PDU), or Downlink-Shared Channel (DL-SCH)).

The PCCH is used to transmit Downlink Control information (DCI) in a case of downlink radio communication (radio communication from the base station apparatus 3 to the terminal apparatus 1). Here, one or multiple pieces of DCI (which may be referred to as DCI formats) are defined for transmission of the Downlink Control Information. In other words, a field for the Downlink Control Information is defined as DCI, and is mapped to information bits.

For example, as the DCI, DCI including information indicating whether a signal included in a scheduled PSCH is downlink radio communication or uplink radio communication may be defined.

For example, as the DCI, DCI including information indicating a downlink transmission period included in a scheduled PSCH may be defined.

For example, as the DCI, DCI including information indicating an uplink transmission period included in a scheduled PSCH may be defined.

For example, as the DCI, DCI including information indicating timing (e.g., the number of symbols from the last symbol included in a PSCH to HARQ-ACK transmission) of transmitting HARQ-ACK to a scheduled PSCH may be defined.

For example, as the DCI, DCI including information indicating a downlink transmission period, a gap, an uplink transmission period included in a scheduled PSCH may be defined.

For example, as the DCI, DCI to be used for scheduling of PSCH for radio communication of one downlink in one cell (transmission of a single downlink transport block) may be defined.

For example, as the DCI, DCI to be used for scheduling of PSCH for radio communication of one uplink in one cell (transmission of a single uplink transport h may be defined.

Here, in a case that a PSCH includes an uplink or a downlink, the DCI includes information about scheduling of the PSCH. Here, the downlink DCI is also referred to as downlink grant or downlink assignment. Here, the uplink DCI is also referred to as uplink grant or Uplink assignment.

The PSCH is used to transmit uplink data (Uplink Shared CHannel (UL-SCH)) or downlink data (Downlink Shared CHannel (DL-SCH)) from a medium access (Medium Access Control (MAC)). In a case of a downlink, the PSCH is also used to transmit System Information (SI), Random Access Response (RAR), or the like. In a case of an uplink, the PSCH may be used to transmit HARQ-ACK and/or CSI along with the uplink data. Furthermore, the PSCH may be used to transmit CSI only, or HARQ-ACK and CSI only. In other words, the PSCH may be used to transmit UCI only.

Here, the base station apparatus 3 and the terminal apparatus 1 exchange (transmit and/or receive) signals with each other in their respective higher layers. For example, the base station apparatus 3 and the terminal apparatus 1 may transmit and/or receive Radio Resource Control (RRC) signaling (also referred to as a Radio Resource Control message (RRC message) or Radio Resource Control information (RRC information)) in a RRC layer. The base station apparatus 3 and the terminal apparatus 1 may transmit and/or receive a Medium Access Control (MAC) control element in a MAC layer. Here, the RRC signaling and/or the MAC control element is also referred to as higher layer signaling. The higher layer here refers to a higher layer as seen from the perspective of a physical layer, and therefore may include one or multiple layers of a MAC layer, an RRC layer, an RLC layer, a PDCP layer, and a NAS layer, for example. For example, the higher layer in processing of the MAC layer may include one or multiple layers of the RRC layer, the RLC layer, the PDCP layer, and the NAS layer, for example.

The PSCH may be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PSCH may be used to transmit UE Capability in the uplink.

Note that, although the PCCH and the PSCH use the same terms in the downlink and the uplink, different channels may be defined in the downlink and the uplink. For example, the PCCH for a downlink may be defined as a Physical Downlink Control CHannel (PDCCH), and the PCCH for an uplink may be defined as a Physical Uplink Control CHannel (PUCCH). For example, the PSCH for a downlink may be defined as a Physical Downlink Shared CHannel (PDSCH), and the PSCH for an uplink may be defined as a Physical Uplink Shared CHannel (PUSCH).

The PRACH may be used to transmit a random access preamble. The PRACH may be used for an initial connection establishment procedure, a handover procedure, a connection re-establishment procedure, uplink transmission synchronization (timing adjustment), and indicating a request for an uplink PSCH (UL-SCH) resource.

In FIG. 1, the following downlink physical signals are used for downlink radio communication. Here, the downlink physical signals are not used to transmit the information output from the higher layer but are used by the physical layer.

Synchronization Signal (SS)
Reference Signal (RS)

The synchronization signal may be used for the terminal apparatus 1 to ensure synchronization in the frequency domain and the time domain in the downlink. The synchronization signal may include a Primary Synchronization Signal (PSS) and/or a Second Synchronization Signal (SSS). The synchronization signal may be used to select, identify, and/or determine a base station transmit beam used by the base station apparatus 3 in the downlink beamforming and/or a terminal receive beam used by the terminal apparatus 1. In other words, the synchronization signal may be used in order for the terminal apparatus 1 to select, identify, and/or determine an index of the base station transmit beam applied to a downlink signal by the base station apparatus 3.

A downlink Reference Signal (hereinafter also simply referred to as a Reference Signal) is used mainly in order for the terminal apparatus 1 to perform channel compensate for a physical channel. In other words, the downlink Reference Signal may include a demodulation reference signal. The downlink Reference Signal may also be used in order for the terminal apparatus 1 to obtain downlink channel state information. In other words, the downlink Reference Signal may include a channel-state-information reference signal. The downlink Reference Signal may be used in Fine synchronization, which is as fine as enabling numerology of a radio parameter, a subcarrier interval, or the like, and window synchronization of FFT, for example.

The downlink physical channels and the downlink physical signals may be collectively referred to as a downlink signal. The uplink physical channels and the uplink physical signals may be collectively referred to as an uplink signal.

The subframe will be described below. Although the term "subframe" is used in the present embodiment, other terms such as a resource unit, a radio frame, a time section, and a time interval may be used.

FIGS. 2A to 2E are diagrams illustrating examples of a subframe (a subframe type). Through FIGS. 2A to 2E, D represents a downlink, and U represents an uplink. As illustrated in FIGS. 2A to 2E, in a certain time section (e.g., a minimum time section that is to be allocated to one UE in a system), one or multiple parts of the following may be included.

Downlink part
Gap
Uplink part

Figure 2:
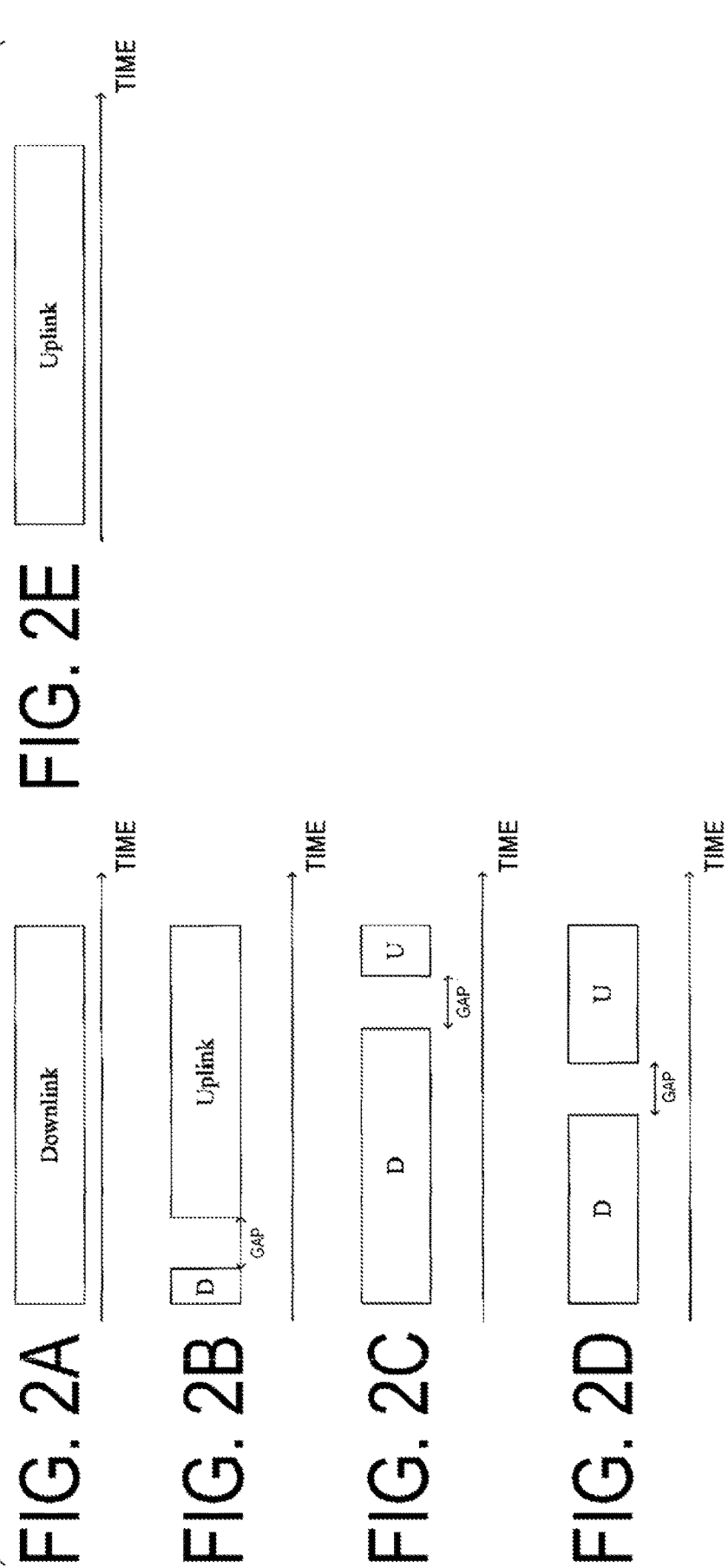
FIGS. 2A to 2E are diagrams illustrating examples of a subframe (a subframe type) according to the embodiment of the present invention.

FIG. 2A illustrates an example where the entire subframe is used for downlink transmission in a certain time section (e.g., a minimum unit of a time resource that can be allocated to one UE). In FIG. 2B, an uplink is scheduled via a PCCH in the first time resource, for example, and then an uplink signal is transmitted after processing delay of the PCCH, switching time from the downlink to the uplink, and a gap for generating a transmit signal. In FIG. 2C, the subframe is used to transmit a downlink PCCH and/or a downlink PSCH in the first time resource, and then the subframe is used to transmit the PSCH or the PCCH after processing delay, switching time from the downlink to the uplink, and a gap for generating a transmit signal. Here, as an example, the uplink signal may be used to transmit HARQ-ACK and/or CSI, namely, UCI. In FIG. 2D, the subframe is used to transmit a downlink PCCH and/or a downlink PSCH in the first time resource, and then the subframe is used to transmit an uplink PSCH and/or PCCH after processing delay, switching time from the downlink to the uplink, and a gap for generating a transmit signal. Here, as an example, the uplink signal may be used to transmit uplink data, namely, UL-SCH. FIG. 2E illustrates an example where the entire subframe is used for uplink transmission (uplink PSCH or PCCH).

Each of the above-mentioned downlink part and uplink part may consist multiple OFDM symbols, similarly to LTE.

Here, a resource grid may be defined by multiple subcarriers and multiple OFDM symbols or SC-FDMA symbols. The number of subcarriers constituting one slot may depend on a cell bandwidth. The number of OFDM symbols constituting each of one downlink part and one uplink part may be one, or two or more. Here, each element within the resource grid is referred to as a resource element. The resource element may be identified by a subcarrier number and an OFDM symbol or SC-FDMA symbol number.

A Random Access procedure according to the present embodiment will described.

The Random Access procedure is categorized into two procedures of a contention based Random Access procedure and a non-Contention based Random Access procedure.

The contention based Random Access procedure is performed at an initial access from a state of not connecting (communicating) with the base station apparatus 3, and/or at a scheduling request in a case that transmittable uplink data or transmittable sidelink data occurs in the terminal apparatus 1 while connecting with the base station apparatus 3, for example.

A state in which transmittable uplink data occurs in the terminal apparatus 1 may include a state in which a buffer status report corresponding to the transmittable uplink data is triggered. A state in which transmittable uplink data occurs in the terminal apparatus 1 may include a state in which a scheduling request triggered based on the occurrence of the transmittable uplink data is pending.

A state in which transmittable sidelink data occurs in the terminal apparatus 1 may include a state in which a buffer status report corresponding to the transmittable sidelink data is triggered. A state in which transmittable sidelink data occurs in the terminal apparatus 1 may include a state in which a scheduling request triggered based on the occurrence of the transmittable sidelink data is pending.

The non-Contention based Random Access procedure is a procedure used by the terminal apparatus 1 indicated by the base station apparatus 3, and is used for promptly ensuring uplink synchronization between the terminal apparatus 1 and the base station apparatus 3 in a case that handover and transmit timing of a mobile station device are ineffective although the base station apparatus 3 and the terminal apparatus 1 are connected.

The contention based Random Access procedure according to the present embodiment will be described.

The terminal apparatus 1 according to the present embodiment receives random access configuration information via a higher layer before initiating the Random Access procedure. The random access configuration information may include the following pieces of information, or a piece of information for determining and/or configuring the following pieces of information.

One or multiple time resources/frequency resources (also referred to as PRACH resources) that can be used to transmit a random access preamble (e.g., a set of available PRACH resources)

One or multiple random access preamble groups

Figure 3:
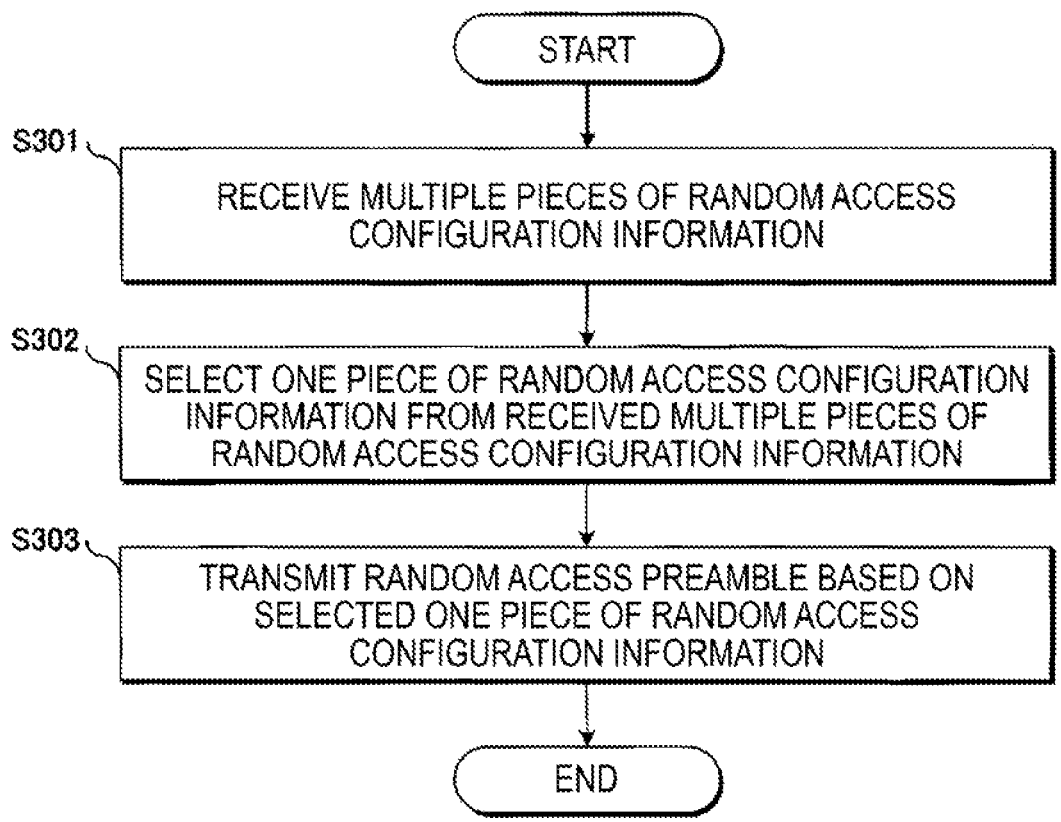
FIG. 3 is a flowchart illustrating an example of operation of a terminal apparatus 1 according to the embodiment of the present invention.
Figure 4:
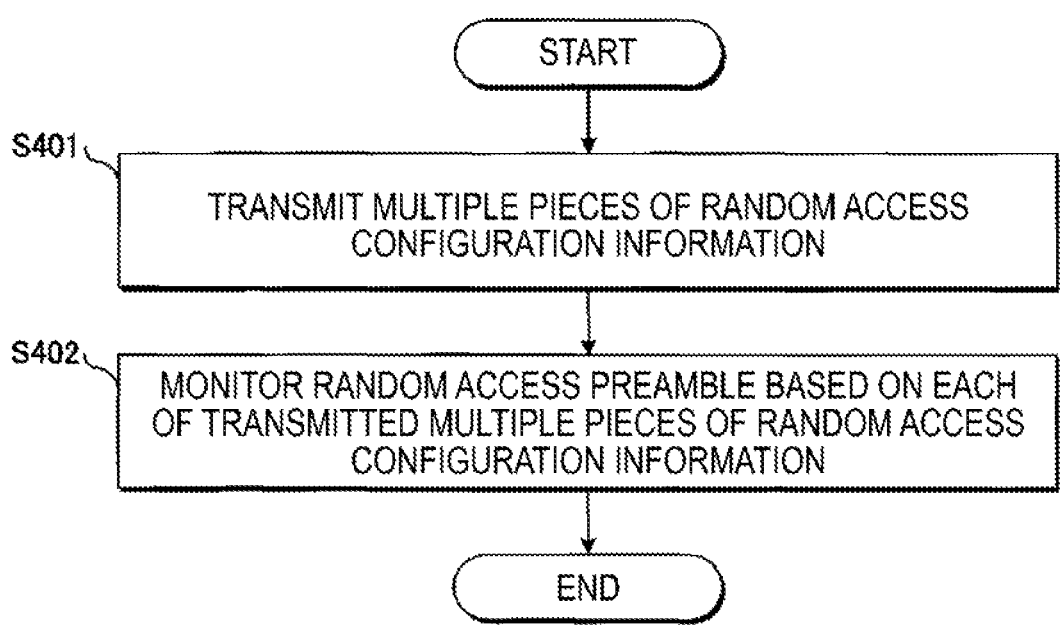
FIG. 4 is a flowchart illustrating an example of operation of a base station apparatus 3 according to the embodiment of the present invention.

One or multiple available random access preambles, or one or multiple available random access preambles in the multiple random access preamble groups A window size and a Contention Resolution timer (mac-Contention Resolution Timer)of a Random Access Response Power ramping step Maximum number of transmissions for preamble transmission Initial transmit power of a preamble Power offset based on a preamble format Maximum number of terminal transmit beams available for transmitting one random access preamble Note that the terminal apparatus 1 may receive one or multiple pieces of random access configuration information, and may select one piece of random access configuration information from the one or multiple pieces of random access configuration information to perform the Random Access procedure. FIG. 3 is a flowchart illustrating an example of operation of the terminal apparatus 1 according to the present embodiment. The terminal apparatus 1 receives multiple pieces of random access configuration information (S301), and selects a piece of random access configuration information to be used for random access configuration used in the Random Access procedure from among the received multiple pieces of random access configuration information (S302). The terminal apparatus 1 transmits a random access preamble based on the selected piece of random access configuration information (S303). FIG. 4 is a flowchart illustrating an example of operation of the base station apparatus 3 according to the present embodiment. The base station apparatus 3 transmits multiple pieces of random access configuration information (S401), and monitors a random access preamble to be transmitted based on each of the transmitted multiple pieces of random access configuration information (S402).

Note that the terminal apparatus 1 may receive the multiple pieces of random access configuration information by using different cells. For example, the terminal apparatus 1 may select one piece of random access configuration information from a piece of random access configuration information received by a first cell formed by the base station apparatus 3 and a piece of random access configuration information received by a second cell formed by the same or a different base station apparatus 3 to perform the Random Access procedure.

Note that the terminal apparatus 1 may receive one or multiple pieces of random access configuration information from a base station apparatus 3 that is different from a base station apparatus 3 to which the terminal apparatus 1 transmits the random access preamble. For example, the terminal apparatus 1 may transmit the random access preamble to a second base station apparatus 3 forming the second cell based on at least one piece of random access configuration information received from a first base station apparatus 3 forming the first cell.

Note that the terminal apparatus 1 may receive random access configuration information by using each of multiple downlink signals to which different base station transmit beams are applied. For example, the terminal apparatus 1 may select one piece of random access configuration information from a piece of first random access configuration information received by a downlink signal to which a first base station transmit beam is applied and a piece of second random access configuration information received by a downlink signal to which a second base station transmit beam is applied to perform the Random Access procedure. The base station apparatus 3 may determine a base station transmit beam that is to be applied when the base station apparatus 3 transmits a downlink signal to the terminal apparatus 1 by receiving the random access preamble based on the piece of random access configuration information selected by the terminal apparatus 1.

A selection rule of a case that the terminal apparatus 1 according to the present embodiment receives multiple pieces of random access configuration information, and selects one piece of random access configuration information from the multiple pieces of the random access configuration information to be used in the Random Access procedure will be described.

The terminal apparatus 1 may select a piece of random access configuration information to be used in the Random Access procedure, based on channel performance between the terminal apparatus 1 and the base station apparatus 3. The terminal apparatus 1 may select a piece of random access configuration information to be used in the Random Access procedure, based on channel performance measured by using a downlink Reference Signal received from the base station apparatus 3.

The terminal apparatus 1 may select one piece of random access configuration information from the received multiple pieces of random access configuration information at random.

The terminal apparatus 1 may select one piece of random access configuration information from the received multiple pieces of random access configuration information, based on the downlink signal received from the base station apparatus 3. Note that the downlink signal may be a downlink signal received from the base station apparatus 3 that is a transmission destination of the random access preamble, or may be a downlink signal received from a different base station apparatus 3. For example, the random access configuration information selected based on the downlink signal from the first base station apparatus 3 forming the first cell may be used in the Random Access procedure with the second base station apparatus 3 forming the second cell.

Information of one or multiple PRACH resources available for transmission of the random access preamble included in the random access configuration information may be independent configuration for each available terminal transmit beam.

Note that at least one of the one or multiple PRACH resources available for transmission of the random access preamble may be a resource available in a case that the random access preamble is transmitted without performing uplink beam sweeping. Note that at least one of the one or multiple available PRACH resources may be a resource available in a case that the random access preamble is transmitted by using uplink beam sweeping. Note that, in at least one of the one or multiple available PRACH resources, a resource to be used in a case that uplink beam sweeping is performed and a resource to be used in a case that uplink beam sweeping is not performed may be divided based on frequency and/or time. Based on time and/or a time resource used to transmit a received random access preamble, the base station apparatus 3 may identify whether or not the terminal apparatus 1 that has transmitted the random access preamble has performed uplink beam sweeping, or is capable of performing uplink beam sweeping.

Note that one or multiple available random access preambles may be an independent configuration for each available terminal transmit beam. For example, a random access preamble group may be configured for each terminal transmit beam, and an available random access preamble may be configured for each random access preamble group. Note that, as the maximum number of transmissions of the random access preambles in each terminal transmit beam, a value common to all of the available terminal transmit beams may be configured.

Figure 5:
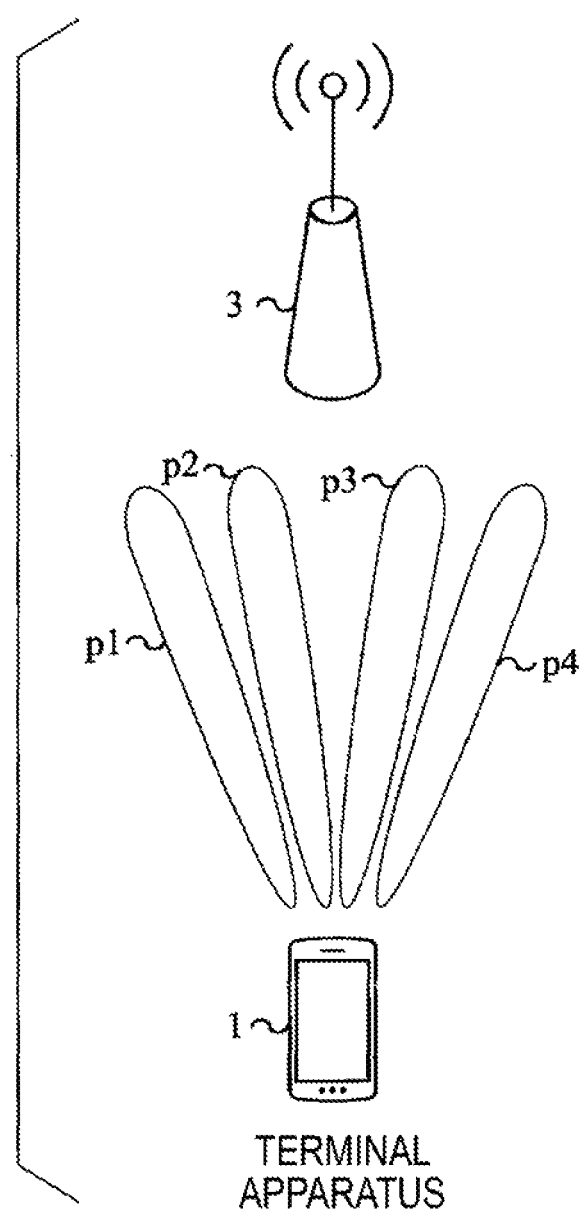
FIG. 5 is a conceptual diagram illustrating an example of uplink precoding available for the terminal apparatus 1 to transmit a random access preamble to the base station apparatus 3 according to the embodiment of the present invention.

FIG. 5 is a conceptual diagram illustrating an example of available terminal transmit beams such that the terminal apparatus 1 transmits a random access preamble to the base station apparatus 3. The terminal apparatus 1 transmits a random access preamble by using any of a terminal transmit beam p1 having a beam index of $I_{p1}$, a terminal transmit beam p2 having a beam index of $I_{p2}$, a terminal transmit beam p3 having a beam index of $I_{p3}$, and a terminal transmit beam p4 having a beam index of $I_{p4}$. Note that each of the beam indexes $I_{p1}$, $I_{p2}$, $I_{p3}$, and $I_{p4}$ may be an antenna port number or an antenna port set number.

Figure 6:
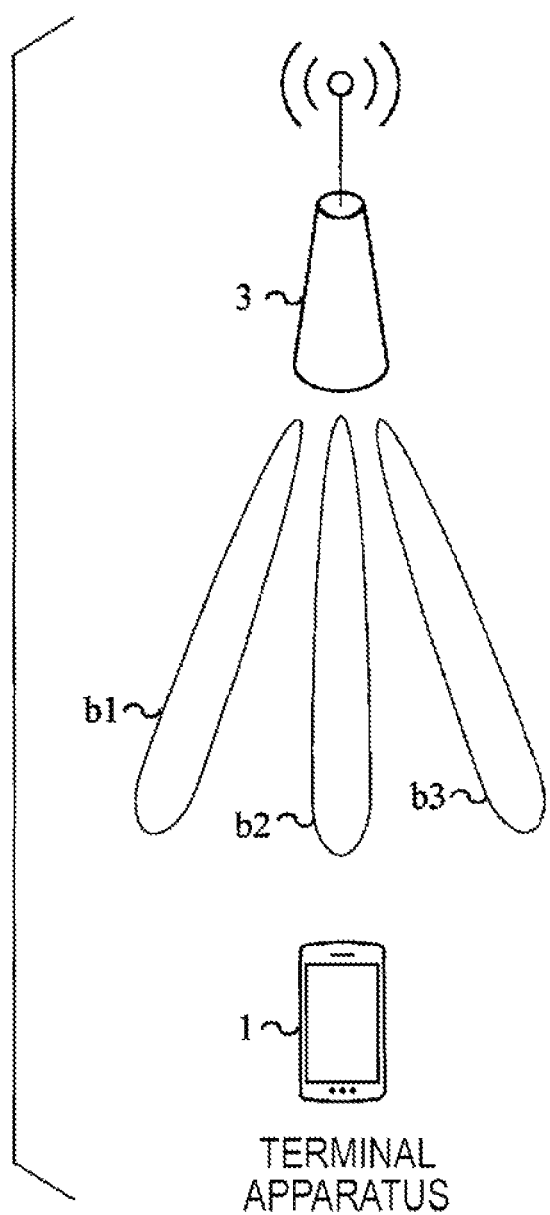
FIG. 6 is a diagram illustrating a case that the terminal apparatus 1 receives a downlink signal using beams to Which any of multiple different types of downlink precoding is applied from the base station apparatus 3 according to the embodiment of the present invention.

FIG. 6 is a diagram illustrating a case where the terminal apparatus 1 receives a downlink signal using multiple different base station transmit beams from the base station apparatus 3. The base station apparatus 3 transmits a downlink signal to the terminal apparatus 1 by using a base station transmit beam b1 having a beam index of $I_{b1}$, a base station transmit beam b2 having a beam index of $I_{b2}$, and/or a base station transmit beam b3 having a beam index of $I_{b3}$. Note that multiple downlink signals using the beam hi, the beam b2, and/or the beam b3 may be transmitted at overlapping time points, or may be transmitted at different time points.

FIG. 7 is a diagram illustrating an example of a relationship between a base station transmit beam used in a downlink signal through which random access configuration information is received, and a PRACH resource indicated by the random access configuration information. Random access configuration information received in a downlink signal using the beam b1 indicates information about a PRACH resource $R_1$. Random access configuration information received in a downlink signal using the beam b2 indicates information about a PRACH resource $R_2$. Random access configuration information received in a downlink signal using the beam b3 indicates information about a PRACH resource $R_3$. The terminal apparatus 1 selects random access configuration information of a downlink signal using any one of base station transmit beams b1, b2, and b3, based on reception performance of the downlink signal, for example, and transmits a random access preamble by using any one of PRACH resources R1, R2, and R3 indicated in the random access configuration information. In a case that a base station transmit beam and a base station receive beam have an interdependent relationship by associating an uplink PRACH resource with the base station transmit beam as described above, the base station apparatus 3 can receive a random access preamble while using an appropriate base station receive beam.

As one or multiple available PRACH resources included in the random access configuration information, each of a subframe number, a system frame number, a symbol number, an available terminal transmit beam, and/or a preamble format that can transmit a random access preamble may be configured.

FIG. 8 is an example of a table of a case that, in the random access configuration information, a transmittable subframe number is indicated as a set of an available PRACH resource. FIG. 8 indicates that 0, 1, 2, and 3 can be configured as PRACH configuration indexes, and subframe numbers i1, i2, i3, and i4 are available, respectively. Note that the subframe number available for each PRACH configuration index may be one or multiple subframe numbers in a system frame. Note that an available system frame number may be indicated for each PRACH configuration index. Note that the available system frame number may indicate whether the available system frame number is an odd number or an even number. Note that an available symbol number may be indicated for each PRACH configuration index in each terminal transmit beam. Alternatively, information for specifying a time resource in an arbitrary time unit may be indicated. Note that an available preamble format may be indicated for each PRACH configuration index.

FIG. 9 is a diagram illustrating an example of a relationship between a PRACH configuration index, a terminal transmit beam to be used to transmit a random access preamble, and an index of an available OFDM symbol number. FIG. 9 indicates that, in a case that a PRACH configuration index is 0, an OFDM symbol number available for transmission of a random access preamble using a first terminal transmit beam is $i_1$, and an OFDM symbol number available for transmission of a random access preamble using a second terminal transmit beam is $i_2$. FIG. 9 also indicates that, in a case that a PRACH configuration index is 1, an OFDM symbol number available for transmission of a random access preamble using the first terminal transmit beam is $i_3$, and an OFDM symbol number available for transmission of a random access preamble using the second terminal transmit beam is $i_4$.

Note that the random access configuration information may indicate multiple PRACH resources corresponding to the number of terminal transmit beams available to the terminal apparatus 1. For example, in a case that the random access configuration information indicates four PRACH resources and the terminal apparatus 1 can use two terminal transmit beams, a random access preamble using two terminal transmit beams by using two or all of the four PRACH resources may be transmitted.

Note that an available OFDM symbol number in each terminal transmit beam may be predetermined in a system. For example, in a case that a subframe to be used to transmit a random access preamble is given by the PRACH resource, prescribed one or multiple OFDM symbols in the subframe may be used for a prescribed terminal transmit beam.

Figure 10:
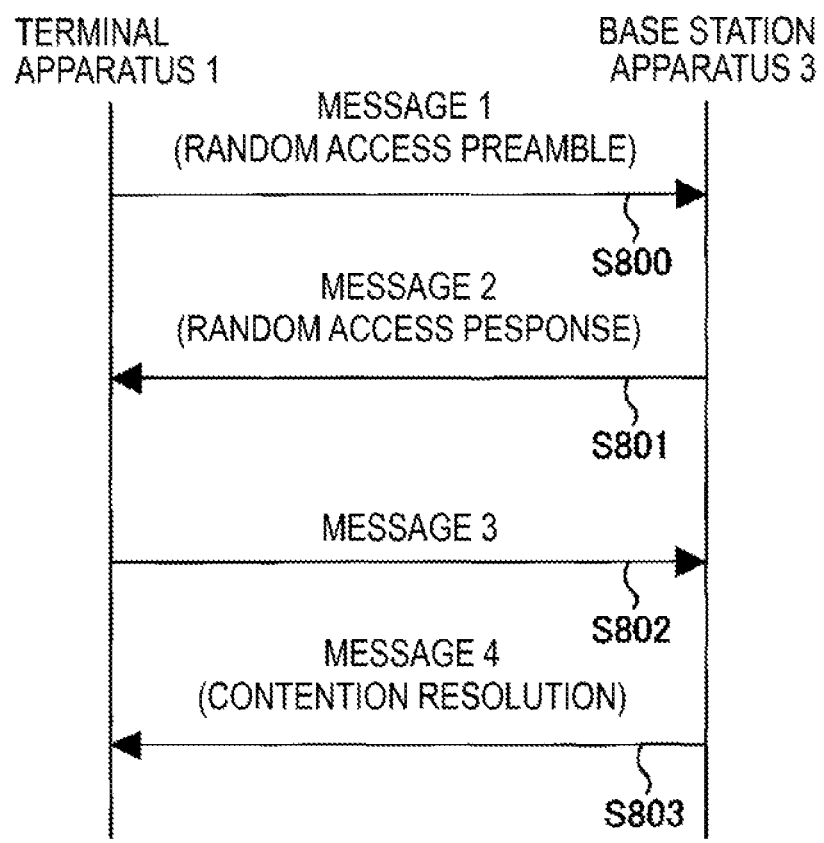
FIG. 10 is a diagram illustrating a contention based Random Access procedure according to the embodiment of the present invention.

As illustrated in FIG. 10, the contention based Random Access procedure is implemented by transmission and/or reception of four types of messages between the terminal apparatus 1 and the base station apparatus 3.

Message 1 (S800)

The terminal apparatus 1 in which transmittable uplink data or transmittable sidelink data occurs transmits a preamble for random access (referred to as a random access preamble) to the base station apparatus 3 in a Physical Random Access Channel (PRACH). The random access preamble to be transmitted may be referred to as Message 1 or Msg 1. The random access preamble is configured to notify the base station apparatus 3 of information by means of multiple sequences. For example, in a case that 64 sequences are available, 6-bit information can be provided to the base station apparatus 3. The information is indicated as a Random Access preamble identifier. A preamble sequence is selected from among a preamble sequence set using a preamble index. The selected random access preamble is transmitted in a specified PRACH resource with transmit power $P_{PRACH}$.

Message 2 (S801)

The base station apparatus 3 that has received the random access preamble generates a Random Access Response including uplink grant for indicating the terminal apparatus 1 to transmit, and transmits the generated Random Access Response to the terminal apparatus 1 on a downlink PSCH. The Random Access Response may be referred to as Message 2 or Msg 2. The base station apparatus 3 calculates transmit timing difference between the terminal apparatus 1 and the base station apparatus 3, based on the received random access preamble, and includes transmit timing adjust information (Timing Advance Command) for adjusting the difference in Message 2. The base station apparatus 3 includes a Random Access preamble identifier corresponding to the received random access preamble in Message 2. The base station apparatus 3 transmits Random Access-Radio Network Temporary Identity (RA-RNTI) (random access response identification information) for indicating a Random Access Response addressed to the terminal apparatus 1 that has transmitted the random access preamble on a downlink PCCH. The RA-RNTI is determined depending on position information in frequency and time of a Physical Random Access Channel through which the random access preamble is transmitted. Here, Message 2 (downlink PSCH) may include the index of the terminal transmit beam that has been used to transmit the random access preamble. Information for determining a terminal transmit beam to be used to transmit Message 3 by using the downlink PCCH and/or Message 2 (downlink PSCH) may be transmitted. Here, the information for determining a terminal transmit beam to be used to transmit Message 3 may include information indicating difference (adjustment, correction) from the index of the preceding that has been used to transmit the random access preamble, Message 3 (S802)

The terminal apparatus 1 that has transmitted the random access preamble monitors a downlink PCCH for a Random Access Response identified by the RA-RNTI in multiple subframe periods (referred to as an RA response window) after the transmission of the random access preamble. In a case that the terminal apparatus 1 that has transmitted the random access preamble detects the relevant RA-RNTI, the terminal apparatus 1 decodes the Random Access Response allocated to the downlink PSCH. The terminal apparatus 1 that has succeeded in decoding the Random Access Response confirms whether or not the Random Access Response includes a Random Access preamble Identifier corresponding to the transmitted random access preamble. In a case that the Random Access preamble Identifier is included, difference in synchronization is corrected by using the transmit timing adjust information indicated in the Random Access Response. The terminal apparatus 1 also transmits data stored in a buffer to the base station apparatus 3 by using the uplink grant included in the received Random Access response. The data to be transmitted by using the uplink grant in this case is referred to as Message 3 or Msg 3.

In a case that the successfully decoded Random Access Response is the first Random Access Response successfully received in the series of Random Access procedure, the terminal apparatus 1 includes information (C-RNTI) for identifying the terminal apparatus 1 in Message 3 to be transmitted, and transmits the information to the base station apparatus 3.

Message 4 (S803)

In a case that the base station apparatus 3 receives uplink transmission in a resource allocated for Message 3 of the terminal apparatus 1 in the Random Access Response, the base station apparatus 3 detects C-RNTI MAC CE included in received Message 3. Then, in a case that the base station apparatus 3 establishes a connection with the terminal apparatus 1, the base station apparatus 3 transmits a PCCH to the detected C-RNTI. In a case that the base station apparatus 3 transmits the PCCH to the detected C-RNTI, the base station apparatus 3 includes uplink grant in the PCCH. These PCCHs transmitted by the base station apparatus 3 are referred to as Message 4, Msg 4, or a contention resolution message.

The terminal apparatus 1 that has transmitted Message 3 starts a contention resolution timer in which a period of monitoring Message 4 from the base station apparatus 3 is specified, and intends to receive a downlink PCCH transmitted from the base station within the timer. In a case that the terminal apparatus 1 that has transmitted C-RNTI MAC CE in Message 3 receives a PCCH addressed to the transmitted C-RNTI from the base station apparatus 3 and the PCCH includes uplink grant for new transmission, the terminal apparatus 1 assumes that the terminal apparatus 1 succeeded in the contention resolution with another terminal apparatus 1, and stops the contention resolution timer to end the Random Access procedure. In a case that the terminal apparatus 1 itself fails to confirm reception of the PCCH addressed to the C-RNTI transmitted in Message 3 within the timer period, the terminal apparatus 1 assumes that the contention resolution has failed to succeed, and the terminal apparatus 1 transmits a random access preamble again to continue the Random Access procedure. Note that, in a case that the contention resolution does not succeed after repeated transmissions of random access preambles for a prescribed number of times, the terminal apparatus 1 determines that there is a problem in random access, and informs the higher layer of the random access problem. For example, the higher layer may reset MAC entity based on the random access problem. In a case that the higher layer requests for reset of the MAC entity, the terminal apparatus 1 stops the Random Access procedure.

Through the transmission and/or reception of the four messages described above, the terminal apparatus 1 can ensure synchronization with the base station apparatus 3, and can transmit uplink data to the base station apparatus 3.

Figure 11:
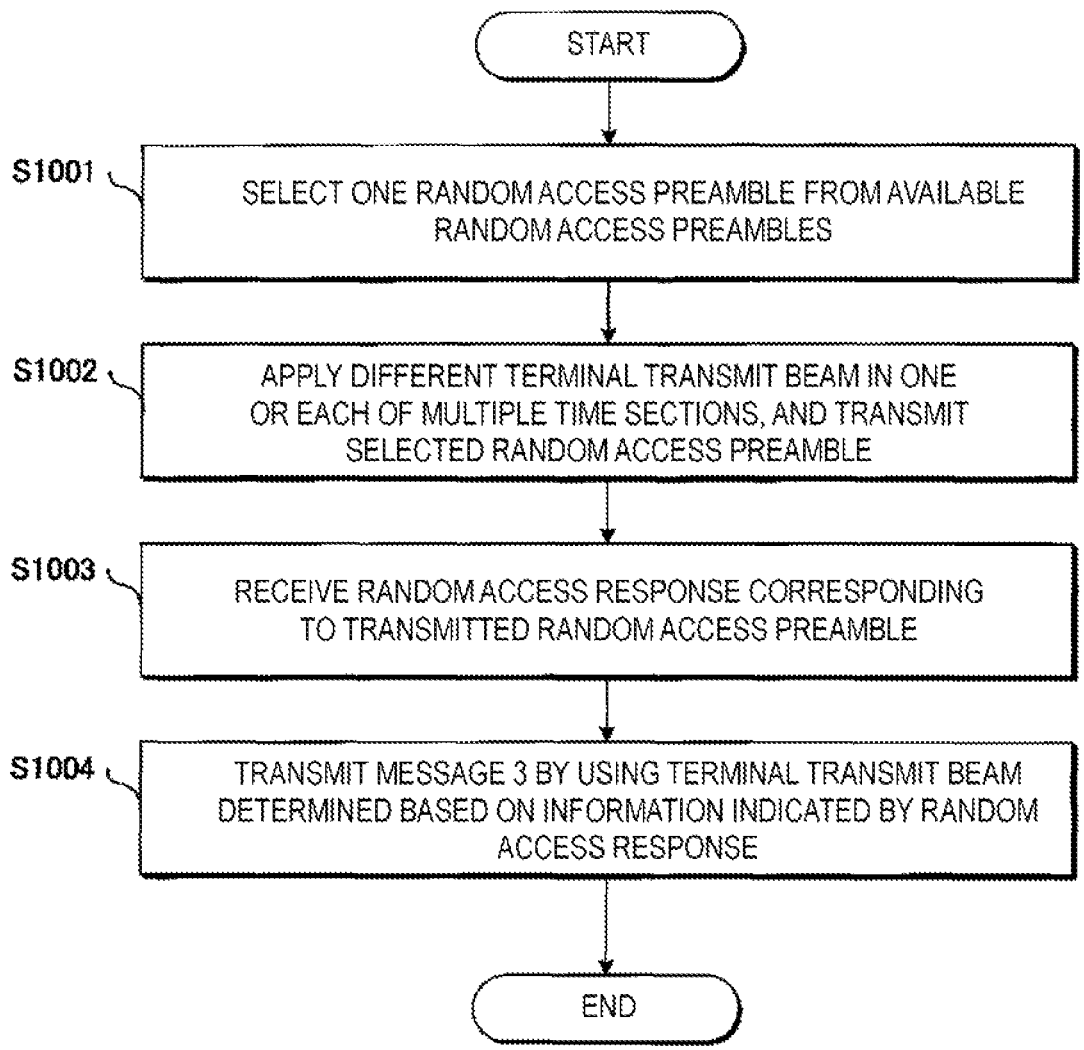
FIG. 11 is a flowchart illustrating an example of random access processing of the terminal apparatus 1 according to the embodiment of the present invention.

FIG. 11 is a flowchart illustrating an example of random access processing of the terminal apparatus 1 according to the present embodiment.

The terminal apparatus 1 selects one random access preamble from one or multiple available random access preambles configured based on information from higher layer (S1001). The terminal apparatus 1 applies a different terminal transmit beam in one or each of multiple time sections (e.g., one or each of multiple OFDM symbols) of the selected one random access preamble in an available PRACH resource, and transmits the random access preamble selected in Step S1001. (S1002). Note that, in Step S1002, transmitting the random access preamble by applying different terminal transmit beams may be transmitting the random access preamble by using different antenna ports or different antenna port sets consisting of multiple antenna ports. The terminal apparatus 1 monitors a downlink signal after transmitting the random access preamble, and receives a Random Access Response corresponding to the transmitted random access preamble (S1003). For example, the Random Access Response corresponding to the transmitted random access preamble may be a Random Access Response including index information of the transmitted random access preamble. Note that, in a case that a Random Access Response corresponding to the transmitted random access preamble fails to be received within a certain period of time, the processing may return to Step S1001 again. The terminal apparatus 1 that has received the Random Access Response corresponding to the transmitted random access preamble transmits Message 3 by using a terminal transmit beam determined based on information indicated by the received Random Access Response (S1004). Note that the information indicated by the Random Access Response may be information indicating any one of the multiple time sections used in the transmission of the random access preamble.

Figure 12:
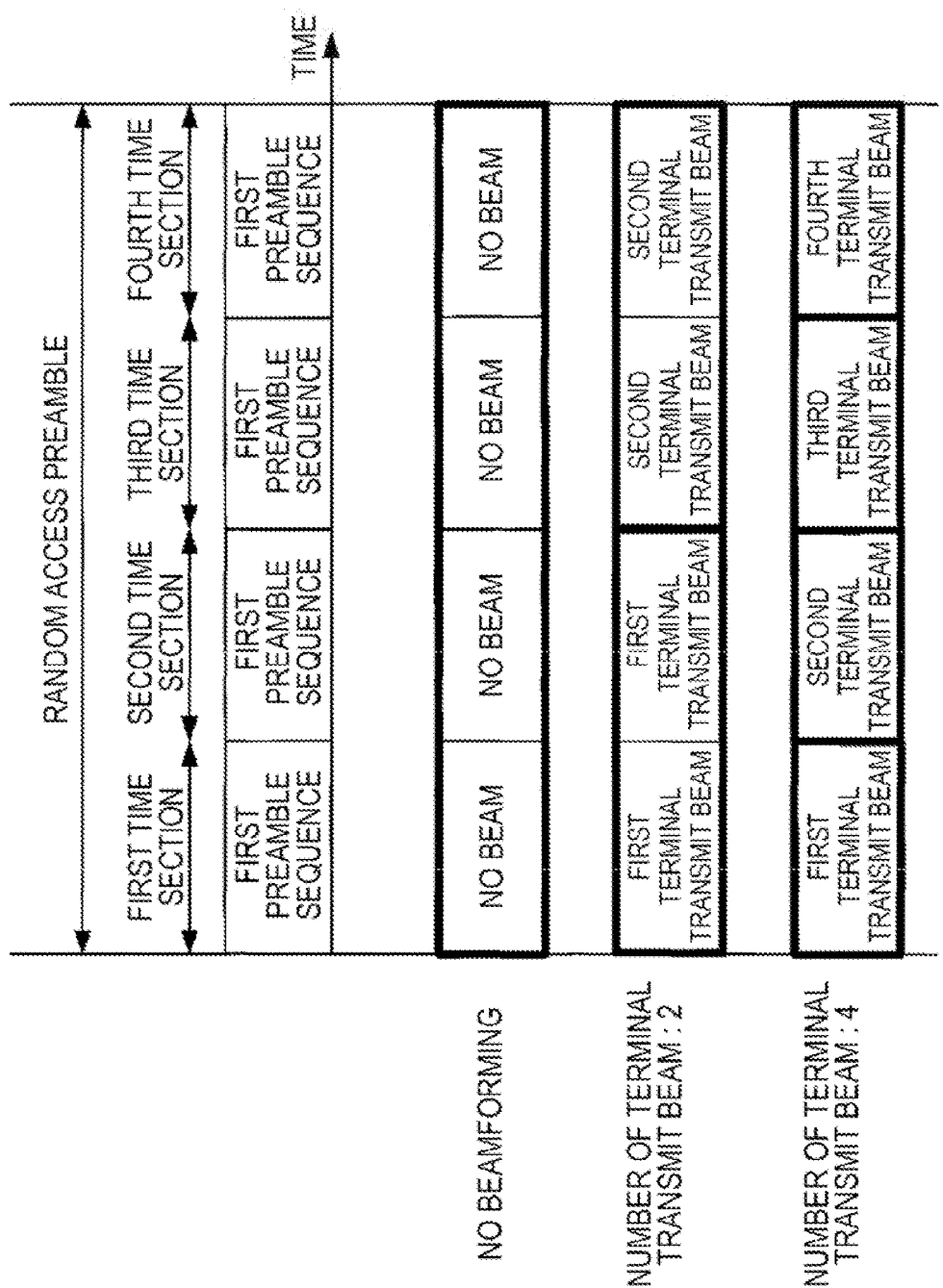
FIG. 12 is a conceptual diagram illustrating an example of transmission of the random access preamble of the terminal apparatus 1 according to the embodiment of the present invention.

FIG. 12 is a conceptual diagram illustrating an example of transmission of the random access preamble of the terminal apparatus 1 according to the present embodiment.

In FIG. 12, one random access preamble is configured by transmitting a first preamble sequence four times in total in a first time section, a second time section, a third time section, and a fourth time section. The terminal apparatus 1 configures a transmit beam to be applied to the preamble sequence in each time section corresponding to the number of terminal transmit beams to be used. For example, the terminal apparatus 1 that does not perform beamforming transmits the first preamble sequence four times without performing beamforming processing in any of the time sections. Note that, in a case that one terminal transmit beam is constantly used, the terminal apparatus 1 may use the same terminal transmit beam in all of the transmission sections. The terminal apparatus 1 that uses two types of terminal transmit beams transmits the first preamble sequence twice by using the first terminal transmit beams in the first time section and the second time section, and transmits the first preamble sequence twice by using the second terminal transmit beams in the third time section and the fourth time section. The terminal apparatus 1 that uses four types of terminal transmit beams transmits the first preamble sequence by using the first terminal transmit beam in the first time section, transmits the first preamble sequence by using the second terminal transmit beam in the second time section, transmits the first preamble sequence by using the third terminal transmit beam in the third time section, and transmits the first preamble sequence by using the fourth terminal transmit beam in the fourth time section.

Note that, in FIG. 12, one random access preamble may be transmitted in one subframe or multiple subframes. Note that, in FIG. 12, the first time section, the second time section, the third time section, and the fourth time section may be a transmission time period of one OFDM symbol, a transmission time period of multiple OFDM symbols, one slot, or one subframe. Note that, although four time sections are illustrated in the example of FIG. 12, any number of time sections may be used. For example, the number of time sections constituting one random access preamble may be the number of OFDM symbols included in one subframe.

Note that FIG. 12 illustrates an example where the first preamble sequence is transmitted in all of the time sections in one random access preamble; however, a different preamble sequence may be used in each time section, or in each terminal transmit beam. Note that a sequence length of each of the preamble sequences constituting the random access preamble may be different depending on the number of terminal transmit beams used by the terminal apparatus 1.

Note that, in the present embodiment, one in which one preamble sequence is transmitted multiple times is referred to as a random access preamble; however, one in which a preamble sequence is transmitted once may be referred to as a random access preamble. For example, multiple random access preambles may be transmitted in multiple time sections, and a different transmit beam may be used in each of the multiple random access preambles.

The base station apparatus 3 that has received the random access preamble illustrated in the example of FIG. 12 may include information indicating arty one of the first time section, the second time section, the third time section, and the fourth time section in the Random Access Response. In this manner, for example, in a case that information indicating the second time section is included in the Random Access Response to the terminal apparatus 1 that has transmitted the random access preamble by using the four types of terminal transmit beams, the terminal apparatus 1 that has received the Random Access Response is informed that the second terminal transmit beam is an appropriate terminal transmit beam, and can apply the second terminal transmit beam to Message 3. Moreover, it is sufficient that the base station apparatus 3 checks correlation of preamble sequences in respective time sections, and transmit information of a time section having the highest correlation. Accordingly, the terminal apparatus 1 performs processing of selecting an appropriate terminal transmit beam, with the base station apparatus 3 being indifferent to the number and the type of the terminal transmit beam that was used to transmit the random access preamble.

Figure 13:
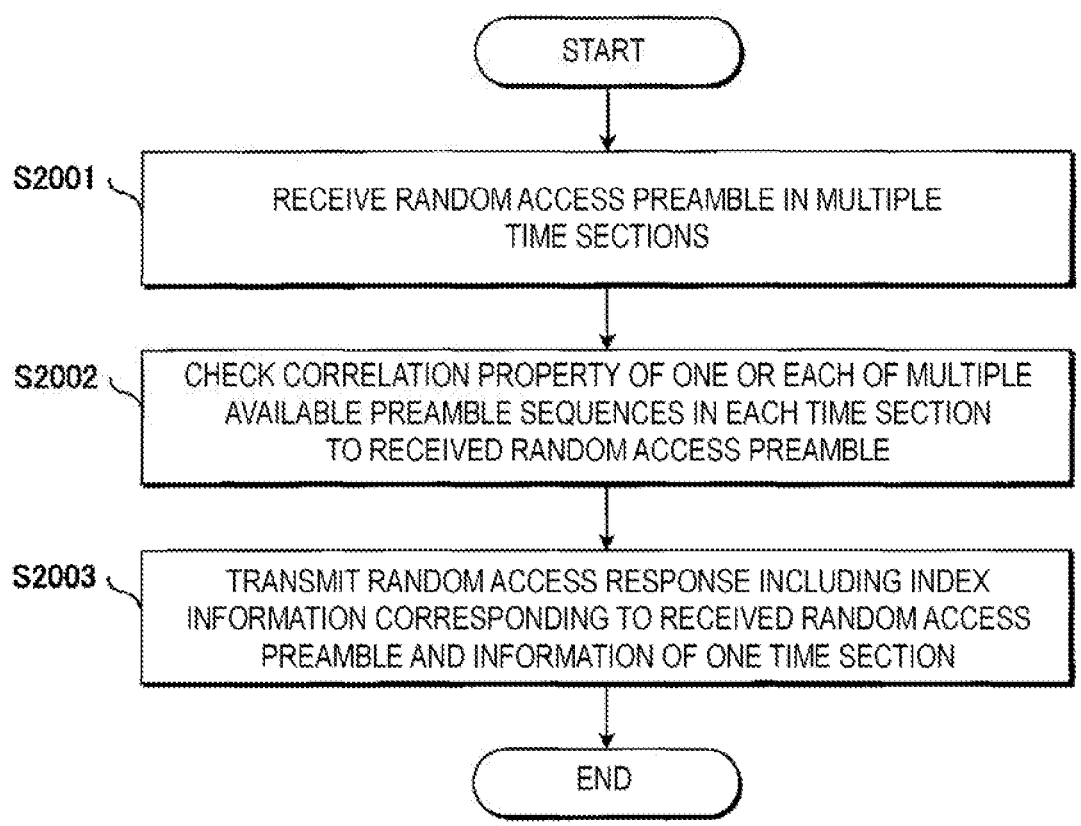
FIG. 13 is a flowchart illustrating an example of random access processing of the base station apparatus 3 according to the embodiment of the present invention.

FIG. 13 is a flowchart illustrating an example of random access processing of the base station apparatus 3 according to the present embodiment.

The base station apparatus 3 receives a random access preamble in multiple time sections in a PRACH resource (S2001). The base station apparatus 3 measures a correlation property of one or each of multiple available preamble sequences in each time section to the received random access preamble (S2002). Based on the measured correlation property in each time section, the base station apparatus 3 transmits a Random Access Response including index information corresponding to the received random access preamble and information indicating one of the multiple time sections used to receive the random access preamble (S2003). Note that the index information and the information indicating one of the multiple time sections included in the Random Access Response may be information determined by the preamble sequence having the highest correlation peak in Step S2002, and a time position of the correlation peak. Note that the information indicating one of the multiple time sections may be an OFDM symbol number.

The terminal apparatus 1 according to the present embodiment may select a terminal transmit beam to be used to transmit a random access preamble, based on a terminal receive beam used to receive a downlink signal from the base station apparatus 3. For example, one or multiple terminal transmit beams that are associated with the terminal receive beam used to receive the downlink signal (or, a terminal receive beam that is determined to be optimal based on measurement of the downlink signal) (e.g., with which optimal transmission performance is obtained as estimated from the downlink signal) may be selected, and the one or multiple terminal transmit beams may be used to transmit a random access preamble. In a case that a Random Access Response corresponding to the transmitted random access preamble fails to be received, a terminal transmit beam that is estimated to have the optimal transmission performance may be selected from among unused terminal transmit beams.

Configurations of apparatuses according to the present embodiment will be described below.

Figure 14:
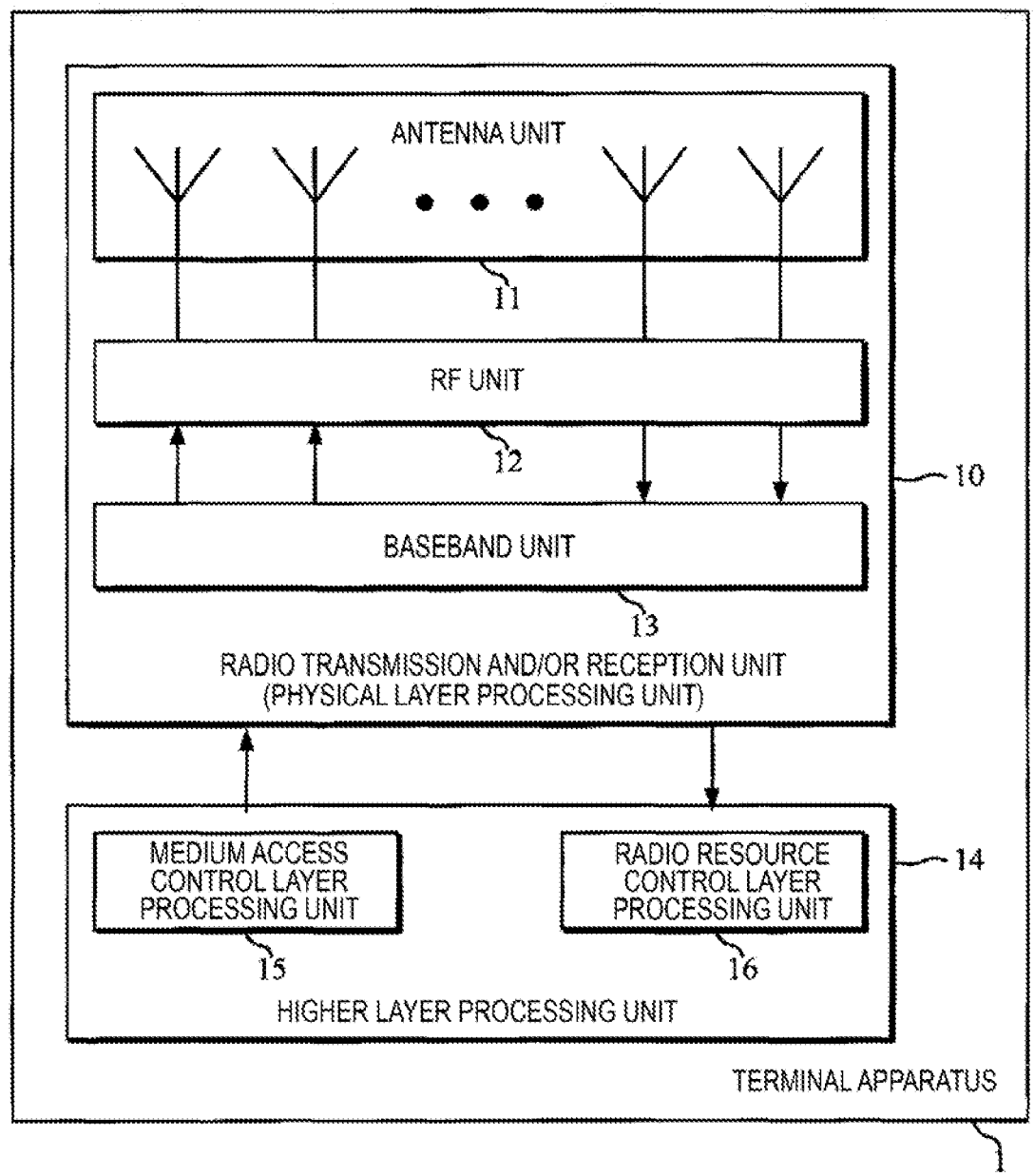
FIG. 14 is a schematic block diagram illustrating a configuration of the terminal apparatus 1 according to the embodiment of the present invention.

FIG. 14 is a schematic block diagram illustrating a configuration of the terminal apparatus 1 in the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of a part of all of a Medium Access Control (MAC) layer, a Packet Data Convergence Protocol (PDCP) layer, a Radio Link Control (RLC) layer, and a Radio Resource Control (RRC) layer.

The medium access control layer processing unit 15 included in the higher layer processing unit 14 performs processing of the Medium Access Control layer. The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages various types of configuration information/parameters of its own apparatus. The radio resource control layer processing unit 16 sets various types of configuration information/parameters based on higher layer signaling received from the base station apparatus 3. Namely, the radio resource control layer processing unit 16 sets the various types of configuration information/parameters in accordance with the information indicating the various types of configuration information/parameters received from the base station apparatus 3. The higher layer processing unit 14 may include a function of selecting one or multiple terminal transmit beams to be used to transmit a random access preamble, based on random access configuration information received from the base station apparatus 3. The higher layer processing unit 14 may include a function of selecting one piece of random access configuration information to be used in the Random Access procedure from among multiple pieces of random access configuration information received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 receives random access configuration information. The radio transmission and/or reception unit 10 may include a function of receiving multiple pieces of random access configuration information. The radio transmission and/or reception unit 10 generates a transmit signal by modulating and coding data, and transmits the transmit signal to the base station apparatus 3. The radio transmission and/or reception unit 10 may include a function of transmitting the random access preamble to the base station apparatus 3 by using the one or multiple terminal transmit beams selected by the higher layer processing unit 14. The radio transmission and/or reception unit 10 may include a function of transmitting the random access preamble to the base station apparatus 3, based on the random access configuration information selected by the higher layer processing unit 14.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 generates an OFDM symbol by performing Inverse Fast Fourier Transform (FFT) on the data, attaches a CP to the generated OFDM symbol, generates a baseband digital signal, and converts the baseband digital signal into an analog signal. The baseband unit 13 outputs the analog signal resulting from the conversion, to the RP unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may include a function of controlling transmit power. The RF unit 12 is also referred to as a transmit power control unit.

Figure 15:
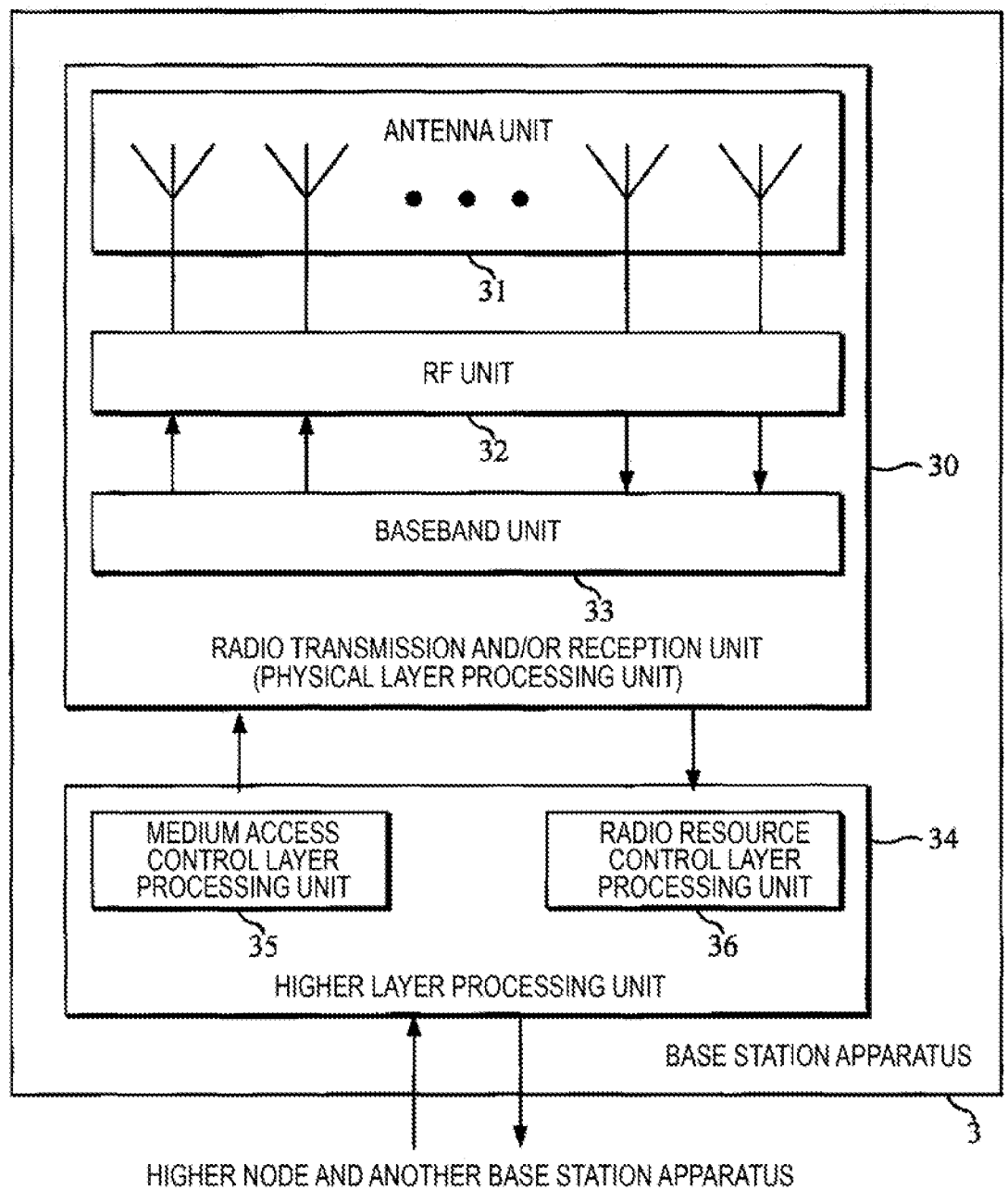
FIG. 15 is a schematic block diagram illustrating a configuration of the base station apparatus 3 according to the embodiment of the present invention.

FIG. 15 is a schematic block diagram illustrating a configuration of the base station apparatus 3 in the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit. A controller that controls operation of each unit, based on various conditions may be additionally provided.

The higher layer processing unit 34 performs processing of a part of all of a Medium Access Control (MAC) layer, a Packet Data Convergence Protocol (PDCP) a Radio Link Control (RLC) layer, and a Radio Resource Control (RRC) layer.

The medium access control layer processing unit 35 included in the higher layer processing unit 34 performs processing of the Medium Access Control layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, System information, an RRC message, a MAC Control Element (CE), and the like, and outputs the generated or acquired data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signal. Namely, the radio resource control layer processing unit 36 transmits/broadcasts information indicating various types of configuration information/parameters. Namely, the radio resource control layer processing unit 36 transmits/broadcasts random access configuration information to an unspecified large number of terminal apparatuses 1.

The radio transmission and/or reception unit 30 includes a function of transmitting random access configuration information. The radio transmission and/or reception unit 30 includes a function of receiving a random access preamble, and a function of transmitting a downlink signal including a Random Access Response to the received random access preamble. A part of other functions of the radio transmission and/or reception unit 30 is similar to the function of the radio transmission and/or reception unit 10, and hence description thereof is omitted. Note that, in a case that the base station apparatus 3 is connected to one or multiple transmission reception points 4, a part or all of the functions of the radio transmission and/or reception unit 30 may be included in each of the transmission reception points 4.

The higher layer processing unit 34 transmits (transfers) or receives control messages or user data between the base station apparatuses 3 or between a higher network device (MME or Serving-GW (S-GW)) and the base station apparatus 3. Although, in FIG. 15, other constituent elements of the base station apparatus 3 and a transmission path of data (control information) between the constituent elements are omitted, it is apparent that the base station apparatus 3 is provided with multiple blocks, as constituent elements, including other functions necessary to operate as the base station apparatus 3. For example, a Radio Resource Management layer processing unit or an application layer processing unit exists in the higher order of the radio resource control layer processing unit 36.

Note that "Units" in the drawings refer to constituent elements to provide the functions and the procedures of the terminal apparatus 1 and the base station apparatus 3, which are also represented by the terms such as a section, a circuit, a constituting device, a device, a unit, and the like.

Each of the units having the reference signs 10 to 16 included in the terminal apparatus 1 may be configured as a circuit. Each of the units having the reference signs 30 to 36 included in the base station apparatus 3 may be configured as a circuit.

Aspects of the terminal apparatus 1 and the base station apparatus 3 according to one aspect of the present invention will be described below.

(1) A first aspect of the present invention is a terminal apparatus 1, the terminal apparatus 1 including: a transmitter 10 configured to transmit one random access preamble in multiple time sections, and change a transmit beam (a terminal transmit beam) to be used to transmit the one random access preamble in one of the multiple time sections or each of the multiple time sections; and a receiver 10 configured to monitor a Random Access Response to the one random access preamble. The Random Access Response includes first information for identifying any one of the multiple time sections.

(2) In the first aspect of the present invention, information indicating any one of the multiple time sections is an OFDM symbol number.

(3) In the first aspect of the present invention, the transmitter 10 transmits Message 3 by using a transmit beam (a terminal transmit beam) determined based on the received first information.

(4) A second aspect of the present invention is a base station apparatus 3, the base station apparatus 3 including: a receiver 30 configured to receive one random access preamble in multiple time sections from a terminal apparatus; and a transmitter 30 configured to transmit a Random Access Response to the one random access preamble to the terminal apparatus. The Random Access Response includes first information for identifying any one of the multiple time sections.

(5) In the second aspect of the present invention, information indicating any one of the multiple time sections is an OFDM symbol number.

(6) In the second aspect of the present invention, the receiver 30 receives Message 3 using a transmit beam (a terminal transmit beam) determined based on the first information.

A program running on an apparatus according to one aspect of the present invention may serve as a program that controls a Central Processing Unit (CPU) and the like to cause a computer to operate in such a manner as to realize the functions of the embodiment according to one aspect of the present invention. Programs or the information handled by the programs are temporarily stored in a volatile memory, such as a Random Access Memory (RAM), stored in a non-volatile memory, such as a flash memory, or in a Hard Disk Drive (HDD), or stored in another storage device system.

Note that a program for realizing the functions of the embodiment according to one aspect of the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be a semiconductor recording medium, an optical recording medium, a magnetic recording medium, a medium that dynamically holds a program in a short period of time, or another computer-readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, a processor of known type, a controller, a microcontroller, or a state machine instead. The above-mentioned electric circuits may be constituted of a digital circuit, or may be constituted of an analog circuit. Furthermore, in a case that with advances in semiconductor technology, a circuit integration technology appears that replaces the present integrated circuits, it is also possible that one or multiple aspects of the present invention use a new integrated circuit based on the technology.

Note that the invention of the present application is not limited to the above-described embodiment. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the embodiment and having mutually the same effects, are substituted for one another is also included in the technical scope of the present invention.

INDUSTRIAL APPLICABILITY

One aspect of the present invention can be used in, for example, a communication system, a communication apparatus, (e.g., a portable phone apparatus, a base station apparatus, a wireless LAN apparatus, or a sensor device), an integrated circuit (e.g., a communication chip), a program, or the like.

REFERENCE SIGNS LIST 1 (1A, 1B) Terminal apparatus
3 Base station apparatus
4 Transmission reception point (TRP)
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
reception circuitry configured to:
receive downlink signals from a base station; and
receive first information indicating a plurality of resource configurations for random access preamble transmission, the resource configurations corresponding to a plurality of terminal transmit beams and to a plurality of orthogonal frequency-division multiplexing (OFDM) symbols;
higher layer operation circuitry configured to select one of the resource configurations based on measurement of the downlink signals, the one of the resource configurations corresponding to one of the terminal transmit beams and one of the OFDM symbols;
transmission circuitry configured to transmit a random access preamble through the one of the terminal transmit beams and the one of the OFDM symbols based on the one of the resource configurations; and
monitoring circuitry configured to monitor second information, the second information
corresponding to the random access preamble,
responsive to, among the terminal transmit beams, only the one of the terminal transmit beams, and
including a slot number and an OFDM symbol number corresponding to the one of the OFDM symbols through which the random access preamble is transmitted.

2. A base station comprising:
transmission circuitry configured to:
transmit downlink signals to a terminal apparatus; and
transmit first information indicating a plurality of resource configurations for random access preamble transmission, the resource configurations corresponding to a plurality of terminal transmit beams and to a plurality of orthogonal frequency-division multiplexing (OFDM) symbols; and
reception circuitry configured to receive a random access preamble through one of the OFDM symbols, wherein:
the random access preamble is transmitted, by the terminal apparatus, through one of the terminal transmit beams based on one of the resource configurations;
the one of the resource configurations is selected, by the terminal apparatus, based on measurement of the downlink signals; and
the one of the resource configurations corresponds to the one of the terminal transmit beams and the one of the OFDM symbols;
wherein the transmission circuitry is further configured to transmit second information, the second information corresponding to the random access preamble, responsive to, among the terminal transmit beams, only the one of the terminal transmit beams, and including a slot number and an OFDM symbol number corresponding to the one of the OFDM symbols through which the random access preamble is received.

3. A method for a terminal apparatus, the method comprising:

receiving downlink signals from a base station;

receiving first information indicating a plurality of resource configurations for random access preamble transmission, the resource configurations corresponding to a plurality of terminal transmit beams and to a plurality of orthogonal frequency-division multiplexing (OFDM) symbols;

selecting one of the resource configurations based on measurement of the downlink signals, the one of the resource configurations corresponding to one of the terminal transmit beams and one of the OFDM symbols;

transmitting a random access preamble through the one of the terminal transmit beams and the one of the OFDM symbols based on the one of the resource configurations; and monitoring second information, the second information corresponding to the random access preamble, responsive to, among the terminal transmit beams, only the one of the terminal transmit beams, and including a slot number and an OFDM symbol number corresponding to the one of the OFDM symbols through which the random access preamble is transmitted.

4. A method for a base station, the method comprising:

transmitting downlink signals to a terminal apparatus;

transmitting first information indicating a plurality of resource configurations for random access preamble transmission, the resource configurations corresponding to a plurality of terminal transmit beams and to a plurality of orthogonal frequency-division multiplexing (OFDM) symbols;

receiving a random access preamble through one of the OFDM symbols, wherein:

the random access preamble is transmitted, by the terminal apparatus, through one of the terminal transmit beams based on one of the resource configurations;

the one of the resource configurations is selected, by the terminal apparatus, based on measurement of the downlink signals; and the one of the resource configurations corresponds to the one of the terminal transmit beams and the one of the OFDM symbols; and transmitting second information, the second information corresponding to the random access preamble, responsive to, among the terminal transmit beams, only the one of the terminal transmit beams, and including a slot number and an OFDM symbol number corresponding to the one of the OFDM symbols through which the random access preamble is received.

\* \* \* \* \*